July 8, 1969  R. S. OTSTOT ET AL  3,453,688
FILAMENT EXTRUSION APPARATUS
Filed Feb. 28, 1967
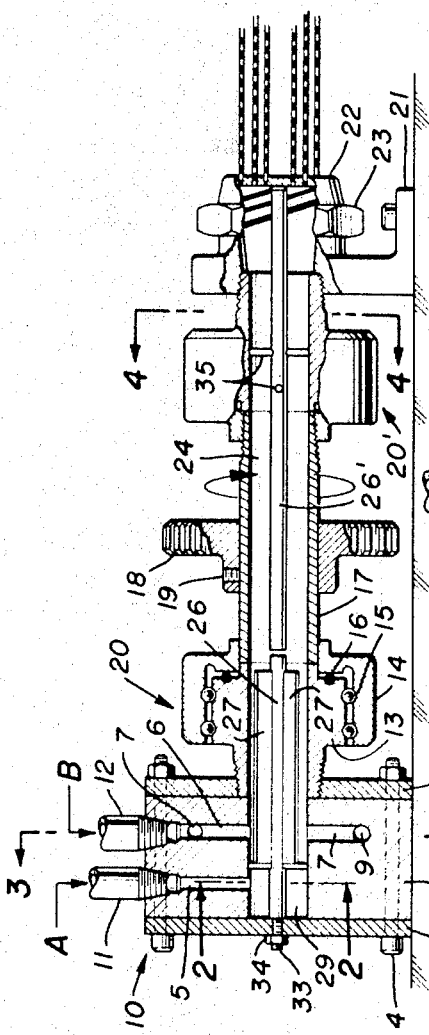
INVENTORS
ROGER S. OTSTOT
ERNEST P. CARTER
BY
ATTORNEY United States Patent Office 3,453,688
Patented July 8, 1969

3,453,688
FILAMENT EXTRUSION APPARATUS
Roger S. Otstot, Raleigh, N.C., and Ernest P. Carter, Decatur, Ala., assignors to Monsanto Company, St. Louis, Mo., a corporation of Delaware
Filed Feb. 28, 1967, Ser. No. 619,307
Int. Cl. D01d 5/20; B30b 11/22
U.S. Cl. 18—8                                   1 Claim

ABSTRACT OF THE DISCLOSURE

The extrusion of segmented filamentary shapes is accomplished by the generation of a patterned stream composed of two or more alternating polymer components and subjecting such patterned stream to a continuous or intermittent rotation about its axis of flow prior to its passage through a multi-orificed spinneret. The rotation of the patterned stream intermediate its points of origin and extrusion imparts a controlled helical configuration to the pattern such that the flow through a given orifice alternates from one to another component with a predetermined sequence and periodicity, resulting in the extrusion of filaments composed of alternating component segments of a chosen length.

---

This invention relates generally to shaped articles of extrusion and, more particularly, to apparatus for use in the manufacture of segmented filaments composed of two or more alternating components of controllable periodicity and sequence of variation.

Within the synthetic fiber industry, there has been a long continuing effort to provide novel synthetic filaments and fibers having the appearance and physical attributes simulating certain properties common to many of the natural fibers, especially wool. This search stems from the failure of most present day commercial synthetic filament production to provide the esthetic characteristics which inhere in many of the natural fibers.

It therefore becomes an object of the instant invention to provide a filament forming apparatus for use in forming segmented synthetic filaments and fibers.

A further object is the provision of a filament extrusion apparatus productive of segmented filaments wherein the segmentation may be readily and precisely controlled as to sequence and periodicity of alternation between components.

These and other objects are attained by the present invention, as will be understood from a reading of the ensuing description and drawings, wherein like numerals designate similar features and wherein:

FIG. 1 is a partially cross-sectioned view taken along the longitudinal axis of a filament forming apparatus embodying the present invention;

FIG. 2 is a section view taken along line 2—2 of FIG. 1;

FIG. 3 is a cross-sectional view taken along line 3—3 of FIG. 1 and showing details of the passageways formed within the manifold block;

FIG. 4 is a cross-sectional view taken along line 4—4 of FIG. 1, showing the disposition of the concentrically mounted core rod, and FIG. 5 is an isometric view of the stream distributor utilized to initially generate a sectored stream pattern.

As shown in FIG. 1, a typical apparatus embodying the present invention comprises a polymer distribution assembly, generally indicated by arrowed leader 10, which assembly is of laminated construction comprising an intermediate manifold block 1 and facing or cover plates 2 and 3 which are clamped in fluid-tight engagement with opposite surfaces of the manifold block by means of through bolts 4. Within manifold block 1 there is formed a plurality of interdrilled passageways 5, 6, 7 and 8 which function to convey in segregated fashion two or more discrete polymer sources to the stream distributor 25 to form the desired pattern. Conduits 11 and 12 serve to interconnect two such separate polymer sources and separate meter pumps, not shown, with the interdrilled passageways 5 and 6, respectively.

Mounted in threaded engagement with centrally apertured cover plate 3 is a rotation joint assembly of conventional construction, generally indicated by arrowed leader 20, such assembly comprising a stationary inner race 13 and a rotatable outer race 14 mounted by ball bearings 15, a face seal element 16 being provided to prevent inter-race leakage. Connecting the outer rotatable race 14, as by means of a threaded engagement, is rotatable conduit 17, the latter having mounted coaxially therewith a drive gear 18 which is maintained in fixed position upon conduit 17 by means of set screw 19. By this arrangement, a suitable variable speed power source, not shown, may be readily engaged with drive gear 18 to rotate the conduit 17 for purposes later to be described.

As seen in FIG. 1, the rotatable conduit terminates by threaded engagement with the outer rotatable race of a second rotating joint assembly 20', which is of similar construction to the previously described assembly 20, the inner race of which is in turn affixed to stationary support 21, as by means of a threaded connection. The stationary support is shaped to receive and retain a conventional spinneret assembly comprising spinneret plate 22 and retaining nut 23.

By the just described arrangement, there is defined a flow passage 24 which extends substantially the entire length of the apparatus, which passage is characterized by an intermediate rotatable section. As seen in FIG. 1, the passage is of a substantially uniform diameter throughout its length with the exception that, vicinal to the spinneret, the passage may be flared somewhat to accommodate the area encompassed by the orifice pattern of spinneret 22.

Hereafter, it will be found convenient to refer to the extrusion assembly as having two terminal zones interposed by an axially rotatable zone or conduit. Axially disposed within the fixed upstream region of passageway 24 is a stream distributor 25 which, as best seen in FIG. 5, comprises a coaxial rod member 26 extending substantially the entire length of the upstream fixed zone of passage 24 and having formed intregally therewith a plurality of vanes 27, which latter are sized to fit snugly against the interior surface or wall of the passageway. The vanes may be substantially coextensive with rod 26 and terminate in the vicinity of rotatable conduit 17; rod 26' extends from the downstream terminus of rod 26 to a point adjacent the plane of the spinneret 22. The longitudinal extent of vanes 27 is such as to define a cavity 29 within manifold block 1 to receive a polymer supply through passageway 5, whereby the stream is divided and caused to flow through alternate channels defined by adjacent pairs of vanes. As seen in FIG. 5, alternate pairs of such vanes are bridged with sector-shaped elements 28, with the result that only alternate channels are in communication with polymer supply passageway 5. More specifically, in the 4-vane embodiment illustrated in the drawing, alternate members of the four channels thus defined are bridged by elements 28 such that only the two lateral channels, as viewed in FIG. 3, communicate with polymer supply conduit 5. It is of course to be understood that any number of vanes may be employed and their arrangement need not be circumferentially equispaced. In the embodiment illustrated, the polymer streams emanating from interdrilled passageways 6 and 7 are caused to flow through the upper and lower channels, as viewed in FIG. 3, with stream segregation being maintained by means of radial vanes 27 and elements 28, as shown in FIG. 5. The stream distributor 25 may readily be maintained in proper alignment within passageway 24 by means of a threaded end 33 formed upon rod 25 to extend through an aperture formed within cover plate 2 and locked in place by means of a retaining nut 34. Similarly, rod 26' may be maintained in axial alignment with rod 26 by any suitable arrangement, such as the supporting legs 35 shown in FIGS. 1 and 4.

In the utilization of the above-described segmented filament extrusion apparatus, polymers A and B are introduced through passageways 5 and 6 in manifold block 1 by means of connector conduits 11 and 12. Upon reaching cavity 29, polymer stream A emanating from passageway 5 is subdivided into two separate streams which are caused to flow through the two lateral channels, as viewed in FIG. 3. Simultaneously, polymer B is subdivided by means of passageways 6, 7 and 8 and is caused to flow as segregated streams through the upper and lower channels, again as viewed in FIG. 3. On passing through these channels and entering the rotatable conduit 17, the streams become merged into a single combined stream, which, due to the viscosity levels characteristic of the spinnable mediums being handled, are maintained as discrete zones within the stream cross section. With the 4-vane arrangement depicted, the stream pattern existing upon entry of the stream into rotatable conduit 17 would be composed of two zones each of spinnable mediums A and B arranged in a circumferentially alternating sequence, much as the spokes of a wheel. As the stream passes through rotatable conduit 17, there is imparted a helical configuration to the previously generated pattern. The rotational speed of tube or conduit 17 may be varied according to the throughput flow rate and length of segments desired in the resultant filaments. It is apparent that if the throughput rate is high while the rotational rate of conduit 17 is low, the lead angle of the helix formed will be much smaller as compared to a low throughput rate at high rotational speeds. Thus, a proper correlation may be attained between the throughput rate and the rotational rate to achieve a desired segment length at the chosen extrusion velocity. The rod 26' serves to increase the lead angle of the helical configuration of the polymer segments. This is because the stationary rod 26' imparts a frictional drag to the inner portions of the polymer segments as the conduit 17 is rotated.

It may now be appreciated that the present segmented filament extrusion method and apparatus is essentially characterized by the generation of a multi-component patterned stream, followed by subjecting such pattern stream to rotation about its flow path to generate a helical configuration lengthwise of the stream, with the result that, as the stream is passed through a multi-orificed spinneret, the components supplying a given orifice at a given point in time will alternate among the various components comprising the initially generated stream pattern. Obviously, the higher the speed of rotation of conduit 17 for a given throughput, the greater will be the helix lead angle generated within the stream pattern, with the result that there will be a relatively more rapid alternation between components through a given orifice and a resultant shorter segment length in the filament formed. Although the foregoing discussion has been largely in terms of a two-component pattern, it is apparent that three or more components may as well be employed, depending on the results it is desired to obtain. Also, the pattern initially generated and introduced into the upstream portion of conduit 17 need not be of a symmetrical configuration; that is, the circumferential extent of any given segment may be varied as desired to thereby effect a variation in the segment length of the resulting filament as between two or more components. Further, the longitudinal extent of vanes 27 has not been found critical and it is possible that a reasonably precise operation may be obtained by the use of vanes which extend only a portion of that distance defined between segments 28 and the upstream end of rotatable conduit 17. Where a certain randomness in segment length is desired, it is even possible to eliminate vanes 27 altogether. Another alternative feature is found in the provision of vanes mounted within and rotatable with conduit 17. This modification has been found particularly desirable where relatively high speeds of rotation of conduit 17 are employed in that any uncontrolled pattern distortion that may otherwise result is minimized. Where twisting of the filamentary bundle as it is extruded is desired or can be accommodated, rotative coupling 20' may be eliminated to the effect that the spinneret assembly and conduit 17 are rotated as an entity. Finally, it may be desired to drive conduit 17 in an oscillating or intermittent rotating fashion, as opposed to continuous rotation, in order to effect variations on a continuous helical configuration. For example, conduit 17 may be driven through a conventional Geneva movement where intermittent rotation is desired.

From the foregoing it may now be appreciated that there has been herewith disclosed a novel method and apparatus for the production of segmented filamentary shapes with a high order of flexibility and precision of control over segment length, as well as providing an abrupt demarcation between adjacent segments. By virtue of this technique (as essentially characterized by the generation of a multi-component stream having a predetermined cross-sectional pattern followed by rotation of the patterned stream about its axis of flow to thereby generate a helical flow pattern along the length of the stream, thence passing the stream through a conventional spinneret), one is enabled to effect the extrusion of segmented filaments exhibiting a readily controlled range and sequence of alternation in segment lengths. In light of such instruction, many obvious variations, modifications and substitutions will readily occur to those skilled in the spinning art. It is to be understood, therefore, that the invention herein set forth, both as regards the many process manipulations and apparatus modifications, is limited only by the fair scope to be ascribed the appended claim.

What is claimed is:

1. An apparatus for spinning multi-component filaments, comprising
   (a) a manifold block having an opening extending therethrough,
   (b) a cover plate attached to one side of the block to close one end of said opening,
   (c) a first stationary rod having secured thereto a plurality of radially-extending longitudinal vanes, said rod and vanes being positioned in the opening in the block, said vanes extending to the wall of said opening to define a plurality of passageways along said rod, said vanes being spaced from said cover plate to define a chamber therebetween,
   (d) means for introducing a first spinning composition into said chamber,
   (e) means secured to the vanes adjacent to the chamber for preventing flow of said first composition through some of said passageways,
   (f) said block having therein an inlet for introducing a second spinning composition into the other of said passageways,
   (g) a stationary spinnerette assembly spaced from said block and having a central opening leading to a spinnerette, said central opening being coaxial with the opening in said manifold block,
   (h) a second stationary rod secured to the spinnerette assembly in a position coaxial with the central opening in said assembly, said second rod extending from the spinnerette assembly to the end of the first rod, and (i) a rotatable conduit member coaxial with and interconnecting the openings in the manifold block and the spinnerette assembly.

References Cited

UNITED STATES PATENTS

| | | | |
|---|---|---|---|
| 2,149,066 | 2/1939 | Orsini | 264—75 |
| 2,171,095 | 8/1939 | Orsini | 264—75 X |
| 2,174,779 | 10/1939 | Delorme | 264—75 X |
| 2,257,067 | 9/1941 | Parsons | 264—75 X |
| 2,479,261 | 8/1949 | Reetz | 264—171 X |
| 2,573,050 | 10/1951 | Orsini | 264—75 X |
| 2,632,204 | 3/1953 | Murray | 264—75 X |
| 2,805,465 | 9/1957 | Miller | 264—75 X |
| 2,815,033 | 12/1957 | Brannlich | 264—75 X |
| 2,983,282 | 5/1961 | Bauer. | |
| 3,180,912 | 4/1965 | Rowe. | |
| 3,230,972 | 1/1966 | Davis. | |
| 3,272,901 | 9/1966 | Sims | 264—75 |
| 3,371,139 | 2/1968 | Frazer | 264—171 |

JULIUS FROME, *Primary Examiner.*

J. H. WOO, *Assistant Examiner.*

U.S. Cl. X.R.

264—167, 171